United States Patent

Cooper et al.

[15] 3,671,484
[45] June 20, 1972

[54] SILICONE RELEASE COATINGS

[72] Inventors: Kenneth G. Cooper; Herbert T. Cooper; Colin M. Rowland, all c/o Midland Silicones Limited, Reading, England

[22] Filed: July 20, 1970

[21] Appl. No.: 56,686

[30] Foreign Application Priority Data

July 23, 1969   Great Britain......................37,055/69

[52] U.S. Cl.............260/33.6 SB, 260/33.8 SB, 260/46.5 R
[51] Int. Cl............................................................C08g 51/28
[58] Field of Search....................260/33.6 SB, 33.8 BB, 824, 260/46.5 R; 117/155

[56] References Cited

UNITED STATES PATENTS

| | | | |
|---|---|---|---|
| 3,565,838 | 2/1971 | Atkinson et al.........................260/825 |
| 3,524,900 | 8/1970 | Gibbon et al. .........................260/825 |
| 3,522,202 | 7/1970 | Wada et al. .....................260/33.8 SB |
| 3,436,251 | 4/1969 | Rees ................................117/155 X |

Primary Examiner—Lewis T. Jacobs
Attorney—Laurence R. Hobey, Robert F. Fleming, Jr. and Howard W. Hermann

[57] ABSTRACT

Abrasion resistant coatings for paper and other substrates are prepared by admixing in an organic solvent, (a) 100 parts by weight of a substantially linear diorganopolysiloxane having methyl radicals as at least 80 percent of the organic substitutes on silicon, the remaining organic substituents being hydrocarbyl radicals of up to 18 carbon atoms, the terminal groups on the siloxane being hydrocarbyl, hydroxyl or alkoxyl radicals, (b) 1.5 to 15 parts by weight of alkylhydrogenpolysiloxane having a molecular weight not exceeding about 5,000, (c) 3 to 34 parts by weight of tin acylate, (d) 2 to 8 parts by weight of an aminated organopolysiloxane of the general formula $R_3SiO(CH_3R'SiO)_x(CH_3XSiO)_y(R''_2SiO)_zSiR_3$ where R and R'' are hydrocarbyl radicals, R' is an alkoxy or alkoxyalkoxy radical of less than six carbon atoms, X is $-R'''NQH$ where R''' is an alkylene radical of three to 10 carbon atoms, Q is a hydrogen atom, trihydrocarbylisilyl radical or a hydrocarbyl radical of less than seven carbon atoms, $X$ is 15 to 95, $y$ is 2 to 25, $z$ is up to 10 percent of the sum of $x+y$ and the sum of $x+y+z$ is 20 to 100.

7 Claims, No Drawings

SILICONE RELEASE COATINGS

This invention relates to novel organosilicon compositions and to the use of such compositions for producing improved siloxane-coated materials.

It is now well-known that siloxane polymers may be applied to cellulosic and other materials, for example synthetic films to produce a coating on the materials which is both water repellent and non-adherent to sticky substances. This particular property of non-adherence has rendered the treated material suitable for a wide variety of applications. For example, siloxane-coated paper is now widely used as interleaving for adhesive tapes and in the packaging of sticky materials such as bitumen and confectionery.

Among the siloxane polymers which have found wide application in the treatment of paper and other film and sheet materials are the alkylhydrogen polysiloxanes and, more preferably mixtures thereof with other organopolysiloxanes, particularly the dimethylpolysiloxanes, the siloxanes being applied either from a solvent solution or an aqueous emulsion. Such siloxane compositions have proved largely successful and good release properties are imparted to the treated surface using both the solvent and emulsion techniques. However, it has been found that when the siloxane compositions are applied to paper from an organic solvent solution the siloxane coating suffers from relatively poor abrasion resistance, that is, it may easily be removed from the paper surface by rubbing with the finger. This lack of abrasion resistance represents a significant commercial disadvantage in that removal of the siloxane coating may occur, for example during operations involving processing of the paper over mechanical rollers. It is known that the abrasion resistance of siloxane release coatings on paper may be improved by including in the siloxane composition prior to application 2-amino butanol or certain amino-alkoxy silanes. Such additives are however not fully satisfactory in systems where high rates of cure of the siloxane coating are desired. When the said additives are employed extended cure times are often necessary to achieve an abrasion resistant siloxane coating having maximum release capability.

There has therefore existed a need for a means of improving abrasion resistance of siloxane paper coatings obtained by the application of compositions containing alkylhydrogen polysiloxanes, particularly under conditions involving high rates of cure of the applied siloxane.

We have now found that when compositions containing alkylhydrogen polysiloxanes are applied to paper the abrasion resistance of the resulting cured siloxane coating may be improved if there is included in the treating composition an organosiloxane in which the silicon-bonded substituents include methyl, alkoxy and amino alkyl radicals. We have also found that the use of the said organosilane obviates the above stated disadvantages associated with the use of 2-aminobutanol and certain amino alkoxyl silanes.

Accordingly this invention provides an organosilicon composition comprising the product obtained by mixing by weight (a) 100 parts of a substantially linear diorganopolysiloxane wherein at least 80 percent of the total silicon-bonded organic radicals are methyl radicals, (b) from 1.5 to 15 parts of an alkylhydrogen polysiloxane, (c) from 3 to 45 parts of an organotin acylate, (d) from 0.5 to 8 parts of an organosiloxane of the formula

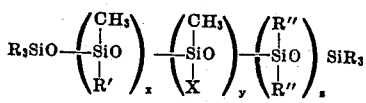

wherein each R and each R'' is a monovalent organic radical, R' represents an alkoxy or alkoxyalkoxy radical having less than six carbon atoms, X represents a radical of the formula —R'''NQH, wherein R''' is an alkylene radical having from three to 10 carbon atoms, Q is a hydrogen atom, a triorganosilyl radical or a monovalent hydrocarbon radical having less than seven carbon atoms, $x$ has a value from 15 to 95, $y$ has a value of from 2 to 25, $z$ has a value up to 10 percent of the total $x+y$, $x+y+z$ has a value from 20 to 100 and (e) an organic solvent.

This invention also includes a process for forming a release and/or water repellent coating on a substrate which comprises applying thereto the composition comprising ingredients (a) to (e) above and thereafter curing the applied siloxane.

The diorganopolysiloxanes (a) employed herein are linear or substantially linear organosiloxane polymers wherein at least 80 percent of the total silicon-bonded organic radicals are methyl radicals. Any remaining radicals in the diorganopolysiloxane may comprise other organic radicals, for example monovalent hydrocarbon radicals and monovalent halogenated hydrocarbon radicals e.g. ethyl, propyl, butyl, octadecyl, phenyl, chlorophenyl and 3,3,3-trifluoropropyl radicals. Preferred as the diorganopolysiloxanes are the dimethylpolysiloxanes. Minor amounts, preferably less than 2 percent of chain-branching units may be present in the diorganopolysiloxane which may, if desired, be end-stopped with organosilyl groups, for example the trimethylsilyl or dimethylphenylsilyl groups. The preferred diorganopolysiloxanes however are those which contain per molecule about two terminal silicon-bonded hydroxyl and/or alkoxyl radicals.

The viscosity of the diorganopolysiloxane (a) is not critical and the polysiloxane may vary in consistency from a viscous liquid to a substantially non-flowing, benzene-soluble gum. Generally, the viscosity of the polymer will be greater than 1,000 cS, the high viscosity liquids or gums being preferred for most applications.

As the alkylhydrogen polysiloxanes (b) there are employed in the compositions of this invention substantially linear siloxane polymers or copolymers in which some of the silicon atoms have hydrogen atoms bonded thereto, the remaining valencies of the silicon atoms being satisfied with alkyl radicals or with the oxygen atoms forming part of the siloxane chain. Preferred as the alkylhydrogen polysiloxanes are those of the unit general formula RHSiO, wherein R is an alkyl radical. Copolymers of these units with diorganosiloxane units, for example dimethylsiloxane units may be employed but such copolymeric diorganosiloxane units are preferably present in minor proportions. If desired the alkylhydrogen siloxane polymers and copolymers may be end-stopped with organosilyl units. Preferred as the alkylhydrogen polysiloxanes are the triorganosilyl end-stopped methylhydrogen polysiloxanes, in particular those having a molecular weight below about 5,000. Such alkylhydrogen polysiloxanes and their use in coating compositions, with or without diorganopolysiloxanes (a), are well-known in the art.

From 1.5 to 15 parts by weight of the alkylhydrogen polysiloxane (b) for every 100 parts by weight of the polydiorganosiloxane (a) may be employed in preparing the compositions of this invention. Where optimum release properties are desired the alkylhydrogen polysiloxane is preferably employed in a proportion of from 5 to 7.5 parts by weight for every 100 parts of the polydiorganosiloxane.

The organotin acylates which are employed as component (c) are monomeric and polymeric tin compounds having therein at least one acyl group and at least one direct carbon to tin valency bond. They are employed in an amount of from 3 to 45 parts for every 100 parts of (a). For optimum curing characteristics and release properties in the cured film it is preferred that the organotin acylate shell be added to the treating composition in a proportion of from 2 parts to 5 parts by weight per part by weight of alkylhydrogen polysiloxane (b). Examples of organotin acylates as used in the compositions of this invention are dibutyltin dimaleate, diethyltin diacetate, dibutyltin diformate, n-octyltin triacetate, dibutyltin dioctoate, dioctyltin diformate, dioctyltin diacetate, dibutyltin dilaurate, dibutyltin diacetate and acyl-substituted distannoxanes and tristannoxanes. Most preferred are dibutyltin diacetate, diacetoxytetrabutyl distannoxane and diacetoxytetraoctyl distannoxane.

Component (d) of the compositions of this invention is a relatively low molecular weight organopolysiloxane containing both silicon-bonded amino-alkyl radicals and silicon-bonded alkoxy and/or alkoxyalkoxy radicals. The organopolysiloxane (d) may contain from 20 to 100 total siloxane units. Up to 10 percent of the total siloxane units may be diorganosiloxane units of the formula $R''_2SiO$, in which each $R''$ is a monovalent organic radical, for example the methyl, ethyl, propyl, butyl, octadecyl, phenyl, naphthyl, vinyl, allyl, benzoyl or chlorophenyl radicals. In the preferred organosiloxanes however, z in the general formula is substantially zero. The R radicals are present in the terminal silyl groups may be any organic radicals which are inert to the remainder of the silicon-bonded radicals in (d). Preferably, R is methyl, phenyl or other alkyl or aryl radicals.

The radical R' may be any alkoxy or alkoxyalkoxy radical containing less than six carbon atoms e.g. methoxy, propoxy or methoxyethoxy, X is the radical R'''NQH wherein R''' is, for example $—(CH_2)_3—$, $—(CH_2)_4—$,

or $—(CH_2)_8—$, and Q is for example, hydrogen, trimethylsilyl, dimethylphenylsilyl, methyl, ethyl, isopropyl or phenyl. Organopolysiloxanes (d) may be prepared for example, by alkoxylation of the desired proportion of the silicon-bonded hydrogen atoms in a methylhydrogen polysiloxane with the appropriate alcohol and subsequent reaction of the remaining SiH groups with an unsaturated amine e.g. allylamine. Such a process is more fully described in or co-pending U.S. application Ser. No. 55,975.

At least 0.5 part and preferably at least 2 parts by weight of the organosiloxane (d) should be employed for every 100 parts of the polydiorganosiloxane (a) if a worthwhile improvement in abrasion resistance is to be obtained. More than 8 parts of (d) does not give rise to significant improvements in the abrasion resistance of the cured film and can deleteriously affect its release properties.

The presence of the organic solvent (c) facilitates the mixing of the components of the composition and the application of the composition to the substrate. The amount of organic solvent employed may vary widely depending on the desired degree of siloxane pick-up by the treated substrate and on the intended method of application. For most purposes however it is preferred that the organic solvent comprise from about 90 to 99 percent by weight of the total weight of the composition. Any suitable organic solvent or mixture of solvents may be employed but it will be understood that the solvent should be sufficiently volatile to permit its removal and allow cure of the siloxane coating to take place at a temperature below that at which deterioration of the substrate or the siloxane coating takes place. Such solvents include for example, hexane, heptane, benzene, mixed aliphatic/aromatic solvents, trichloroethylene and perchloro-ethylene. The preferred solvents are liquid hydrocarbons boiling below 150° C, particularly xylene and mineral spirits.

The compositions of this invention may be prepared by mixing the ingredients (a) to (e) in any convenient manner. Ingredient (d) may however, exhibit a tendency to gel on contact with the organotin acylate in the absence of a diluent. Preferably therefore (c) and (d) are not mixed together in the absence of one or more of the other ingredients when preparing the compositions. As a matter of manufacturing and commercial expediency it is preferred to supply the siloxanes (a) and (b) as a solution in an organic solvent and to add the remaining components (c) and (d) to this solution, together with any desired additional organic solvent when the composition is made up ready for use.

Any of the well-known coating techniques such as roller coating, application by Meyer rod or knife coating may be employed to treat paper and other substrates according to the process of this invention. Following the coating step the coated substrate may then be allowed to dry by storage at room temperature and the siloxane thereafter cured. In practice however, we prefer to hasten the drying step and the subsequent cure of the siloxane and this may be achieved by heating the coated substrate, preferably to a temperature within the range from 60° to 150° C for periods varying from several seconds to several minutes.

In order to avoid premature gelation of the coating composition the siloxane components (a) and (b) are best not combined with the organotin acylate until the composition is required for use. As the amino compound may also exert some catalytic curing action on the composition it may, in some cases, also be desirable to store this component separately from the siloxane components (a) and (b).

When prepared as a dilute solution in solvent the compositions of this invention remain usable for periods of several hours. If desired the useful life of the compositions may be extended by including therein an additional stabilizing component (f) the preferred stabilizers being the lower fatty acids, particularly acetic acid and propionic acid.

The composition and process of the present invention find application in the production of abrasion resistant, adhesive and water-repellent coatings on a wide variety of papers and paper products including glassine, kraft, vegetable parchment, tissue and cardboard, the treated papers being useful, for example, in the fabrication of interleaving papers, backing papers for adhesive tapes and as bags, and linings for bags, for holding sticky materials such as bitumen. In particular the compositions of this invention permit the production of an abrasion resistant cured siloxane release film or coating under conditions involving relatively high siloxane cure rates. The compositions are also useful as coating materials for substrates other than paper, for example polyethylene coated papers, cellophane, nylon and polyethylene terephthalate, to provide thereon a water repellent or release surface.

The following examples in which the parts are expressed by weight illustrate the invention.

EXAMPLE 1

A series of four compositions containing various levels of methylhydrogen polysiloxane were prepared by mixing the following ingredients:

| | |
|---|---|
| Xylene | 94 parts |
| Dimethylpolysiloxane gum (silanol terminated) | 6 parts |
| Methylhydrogen polysiloxane (trimethylsilyl terminated) (MW≈2,500) | x parts |
| Copolymer A (as 50% w/w solution in toluene) | 0.45 parts |
| Dibutyltin diacetate (as 50% w/w solution in toluene | 1.9 parts |
| Acetic Acid | 0.2 parts |

The values of x in the four compositions were 0.18, 0.36, 0.45 and 0.63 parts respectively and the compositions were prepared by dissolving the polysiloxane components in the xylene and thereafter adding and mixing in the remaining ingredients. Copolymer A was a trimethylsilyl end-stopped copolymer of, on average, 36 methyl(methoxy)-siloxane units and 4 methyl-(gamma-aminopropyl)siloxane units.

The compositions were then applied to one surface of samples of glassine paper and the samples heated for 10 seconds at 140° C. Silicone pick-up by the paper was 0.8 g/m².

Although the siloxane surfaces showed a very slight tendency to smear immediately after the curing step they became non-smearing in less than one hour and were highly resistant to abrasion on rubbing with the finger.

EXAMPLE 2

Three compositions containing various levels of dibutyltin diacetate were prepared by mixing, in the manner described in Example 1, the following ingredients:

| | |
|---|---|
| Xylene | 94 parts |

| | |
|---|---|
| Dimethylpolysiloxane gum (silanol terminated) | 6 parts |
| Methylhydrogen polysiloxane (trimethylsilyl terminated) (MW≈2,500) | 0.36 parts |
| Copolymer A (as Example 1) | 0.45 parts |
| Dibutyltin diacetate (50% w/w solution in toluene) | y parts |
| Acetic Acid | 0.2 parts |

In the three compositions y had values of 1.0, 2.8 and 3.8 parts respectively. The compositions were applied to both glassine paper and vegetable parchment the coated papers thereafter being heated to 80° C for 30 seconds to cure the siloxane coating. Silicone pick-up by the papers was 0.8 g/m². Immediately following the cure step the siloxane coatings showed a very slight tendency to smear. Within an hour the coatings had become non-smearing and were highly resistant to abrasion.

EXAMPLE 3

A composition was prepared by mixing

| | |
|---|---|
| Xylene | 94 parts |
| Dimethylpolysiloxane gum (silanol terminated) | 6 parts |
| Methylhydrogen polysiloxane (trimethylsilyl terminated-) (MW≈2,500) | 0.4 parts |
| + Copolymer B | 0.23 parts |
| Dibutyltin diacetate | 0.9 parts |

+ copolymer B was a trimethylsilyl terminated copolymer of, on average 32 methyl(methoxyethoxy) siloxane units and 8 methyl(gamma-aminopropyl) siloxane units.

The composition was applied to pre-sized kraft paper and cured by heating to 140° C for 10 seconds. The cured coating exhibited good release from sticky tape and was resistant to abrasion.

That which is claimed is:

1. A composition comprising the product obtained by mixing by weight (a) 100 parts of a substantially linear diorganopolysiloxane wherein at least 80 percent of the total silicon-bonded organic radicals are methyl radicals (b) from 1.5 to 15 parts of an alkylhydrogen polysiloxane (c) from 3 to 45 parts of an organotin acylate, (d) from 0.5 to 8 parts of an organosiloxane of the formula

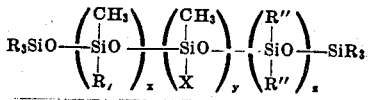

wherein each R and each R'' is a monovalent organic radical, R' represents an alkoxy or alkoxyalkoxy radical having less than 6 carbon atoms and X represents a radical of the formula —R'''NQH wherein R''' is an alkylene radical having from three to 10 carbon atoms, Q is a hydrogen atom, a triorganosilyl radical or a monovalent hydrocarbon radical having less than seven carbon atoms, x has a value of from 15 to 95, y has a value of from 2 to 25, z has a value up to 10 percent of the total of $x+y$ and $x+y+z$ has a value from 20 to 100 and (e) an organic solvent.

2. A composition as claimed in claim 1 wherein the diorganopolysiloxane (a) has a viscosity in excess of 1,000 cS at 25° C.

3. A composition as claimed in claim 1 wherein the alkylhydrogen polysiloxane (b) is a triorganosilyl end-stopped methylhydrogen polysiloxane.

4. A composition as claimed in claim 1 wherein the alkylhydrogen polysiloxane (b) is employed in a proportion of from 5 to 7.5 parts by weight per 100 parts by weight of the diorganopolysiloxane (a).

5. A composition as claimed in claim 1 wherein the organotin acylate is employed in a proportion of from 2 parts to 3 parts by weight for every part by weight of alkylhydrogen polysiloxane (b).

6. A composition as claimed in claim 1 wherein the organic solvent is a liquid hydrocarbon.

7. A composition as claimed in claim 1 which also contains (f) acetic acid or propionic acid as stabilizer.

* * * * *